United States Patent
Godin et al.

(10) Patent No.: US 12,369,070 B2
(45) Date of Patent: Jul. 22, 2025

(54) SELECTION OF SHARED CENTRAL UNIT USER PLANE BY CENTRAL UNIT CONTROL PLANE

(71) Applicant: Nokia Technologies Oy, Espoo (FI)

(72) Inventors: Philippe Godin, Versailles (FR); David Navrátil, Helsinki (FI); Esa Mikael Malkamäki, Espoo (FI); Ugur Baran Elmali, Munich (DE)

(73) Assignee: Nokia Technologies Oy, Espoo (FI)

( * ) Notice: Subject to any disclaimer, the term of this patent is extended or adjusted under 35 U.S.C. 154(b) by 375 days.

(21) Appl. No.: 18/189,884

(22) Filed: Mar. 24, 2023

(65) Prior Publication Data
US 2023/0328578 A1 Oct. 12, 2023

Related U.S. Application Data

(60) Provisional application No. 63/329,189, filed on Apr. 8, 2022.

(51) Int. Cl.
*H04W 28/02* (2009.01)
*H04L 12/18* (2006.01)
*H04W 76/40* (2018.01)

(52) U.S. Cl.
CPC ..... *H04W 28/0252* (2013.01); *H04L 12/1886* (2013.01); *H04W 76/40* (2018.02)

(58) Field of Classification Search
CPC ............. H04W 28/0252; H04W 76/40; H04L 12/1886
See application file for complete search history.

(56) References Cited

U.S. PATENT DOCUMENTS

| | | | | |
|---|---|---|---|---|
| 11,765,555 B1* | 9/2023 | Babaei | ............... | H04W 80/04 370/312 |
| 2010/0182963 A1* | 7/2010 | Fischer | ............... | H04W 48/18 370/329 |
| 2023/0209390 A1* | 6/2023 | Zeng | ............... | H04W 24/02 |
| 2023/0292219 A1* | 9/2023 | Byun | ............... | H04W 40/246 |
| 2023/0354106 A1* | 11/2023 | Godin | ............... | H04W 76/40 |

(Continued)

FOREIGN PATENT DOCUMENTS

| | | | | |
|---|---|---|---|---|
| CN | 116017418 A | * | 4/2023 | ............ H04W 68/02 |
| GB | 2614303 A | * | 7/2023 | ............ H04L 12/189 |

OTHER PUBLICATIONS

"3rd Generation Partnership Project; Technical Specification Group Radio Access Network; NG-RAN; Xn application protocol (XnAP) (Release 16)", 3GPP TS 38.423, V16.8.0, Dec. 2021, pp. 1-467.

(Continued)

*Primary Examiner* — Kenny S Lin
(74) *Attorney, Agent, or Firm* — Nokia Technologies Oy (57) ABSTRACT

Systems, methods, apparatuses, and computer program products for informing a central unit control plane regarding the capabilities and/or service area of a central unit user plane are provided. For example, a method may include notifying, by a central unit user plane to a central unit control plane using a message, at least one of an offered multicast radio bearer configuration to be shared in relation with a multicast/broadcast session served by the central unit user plane and one or more offered service area corresponding to the central unit user plane.

20 Claims, 6 Drawing Sheets

(56) References Cited

U.S. PATENT DOCUMENTS

2024/0064831 A1\* 2/2024 Babaei ................. H04W 76/15
2024/0357434 A1\* 10/2024 Navrátil ............ H04W 36/0058

OTHER PUBLICATIONS

"3rd Generation Partnership Project; Technical Specification Group Radio Access Network; NG-RAN; E1 Application Protocol (E1AP) (Release 16)", 3GPP TS 38.463, V16.8.0, Dec. 2021, pp. 1-245.

"3rd Generation Partnership Project; Technical Specification Group Radio Access Network; NR; NR and NG-RAN Overall Description; Stage 2 (Release 16)", 3GPP TS 38.300, V16.8.0, Dec. 2021, pp. 1-152.

"New Work Item on NR support of Multicast and Broadcast Services", 3GPP TSG RAN Meeting #86, RP-193248, Agenda: 9.1.2, Huawei, Dec. 9-12, 2019, 5 pages.

\* cited by examiner

SELECTION OF SHARED CENTRAL UNIT USER PLANE BY CENTRAL UNIT CONTROL PLANE

RELATED APPLICATION

This application claims priority to U.S. Provisional Application No. 63/329,189 filed Apr. 8, 2022 which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing informing a central unit control plane regarding the capabilities and/or service area of a central unit user plane.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform notifying, by a central unit user plane to a central unit control plane using a message, at least one of an offered multicast radio bearer configuration to be shared in relation with a multicast/broadcast session served by the central unit user plane and one or more offered service area corresponding to the central unit user plane.

An embodiment may be directed to an apparatus. The apparatus can include at least one processor and at least one memory comprising computer program code. The at least one memory and computer program code can be configured, with the at least one processor, to cause the apparatus at least to perform receiving, from a central unit user plane at a central unit control plane in a message, at least one of an offered multicast radio bearer configuration to be shared in relation with a multicast/broadcast session served by the central unit user plane and one or more offered service area corresponding to the central unit user plane. The at least one memory and computer program code can also be configured, with the at least one processor, to cause the apparatus at least to perform determining whether to select the central unit user plane based on the offered multicast radio bearer configuration.

An embodiment may be directed to a method. The method can include notifying, by a central unit user plane to a central unit control plane using a message, at least one of an offered multicast radio bearer configuration to be shared in relation with a multicast/broadcast session served by the central unit user plane and one or more offered service area corresponding to the central unit user plane.

An embodiment may be directed to a method. The method can include receiving, from a central unit user plane at a central unit control plane in a message, at least one of an offered multicast radio bearer configuration to be shared in relation with a multicast/broadcast session served by the central unit user plane and one or more offered service area corresponding to the central unit user plane. The method can also include determining whether to select the central unit user plane based on the offered multicast radio bearer configuration.

An embodiment may be directed to an apparatus. The apparatus can include means for notifying, by a central unit user plane to a central unit control plane using a message, at least one of an offered multicast radio bearer configuration to be shared in relation with a multicast/broadcast session served by the central unit user plane and one or more offered service area corresponding to the central unit user plane.

An embodiment may be directed to an apparatus. The apparatus can include means for receiving, from a central unit user plane at a central unit control plane in a message, at least one of an offered multicast radio bearer configuration to be shared in relation with a multicast/broadcast session served by the central unit user plane and one or more offered service area corresponding to the central unit user plane. The apparatus can also include means for determining whether to select the central unit user plane based on the offered multicast radio bearer configuration.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing informing a central unit control plane regarding the capabilities and/or service area of a central unit user plane, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Support of multicast and broadcast service (MBS) may be of value in release 17 (Rel-17) new radio (NR). Point to multi-point (PTM) transmission may be used to efficiently provision MBS services to multiple users by using the same radio framework as unicast transmission. It may further be valuable to enable minimization of data loss for a multicast session using packet data convergence protocol (PDCP) sequence number (SN) synchronization among multiple cells.

One approach to minimize data loss may be to synchronize PDCP SN using a shared central unit (CU) user plane (UP) entity hosting the PDCP entity of the multiple cells and providing the same PDCP configuration.

The multicast bearer configuration which is being used by the shared CU UP for a given MBS session may be the configuration triggered by the first CU control plane (CP) which requested to use the shared CU UP. In a currently disclosed approach, the second and following CU CPs requesting to use the shared CU UP may then provide consent to reuse the multicast radio bearer configuration that is in use by the shared CU UP without knowing this radio bearer configuration. In this approach, the second and subsequent CU CPs requesting to use the shared CU UP may blindly accept whichever multicast radio bearer configuration the shared CU UP is using, but this multicast radio bearer configuration may not at all fit the quality of service (QoS) requirement(s) from the perspective of the second and subsequent CU CPs.

The shared CU UP may be unlikely to be able to share a common PDCP entity public land mobile network (PLMN)-wide. It may, therefore, be beneficial for a CU CP to know in advance which area the shared CU UP is able to cover before requesting the service of the shared CU UP rather than using a dedicated CU UP or another shared CU UP with different area coverage.

Figure 1:
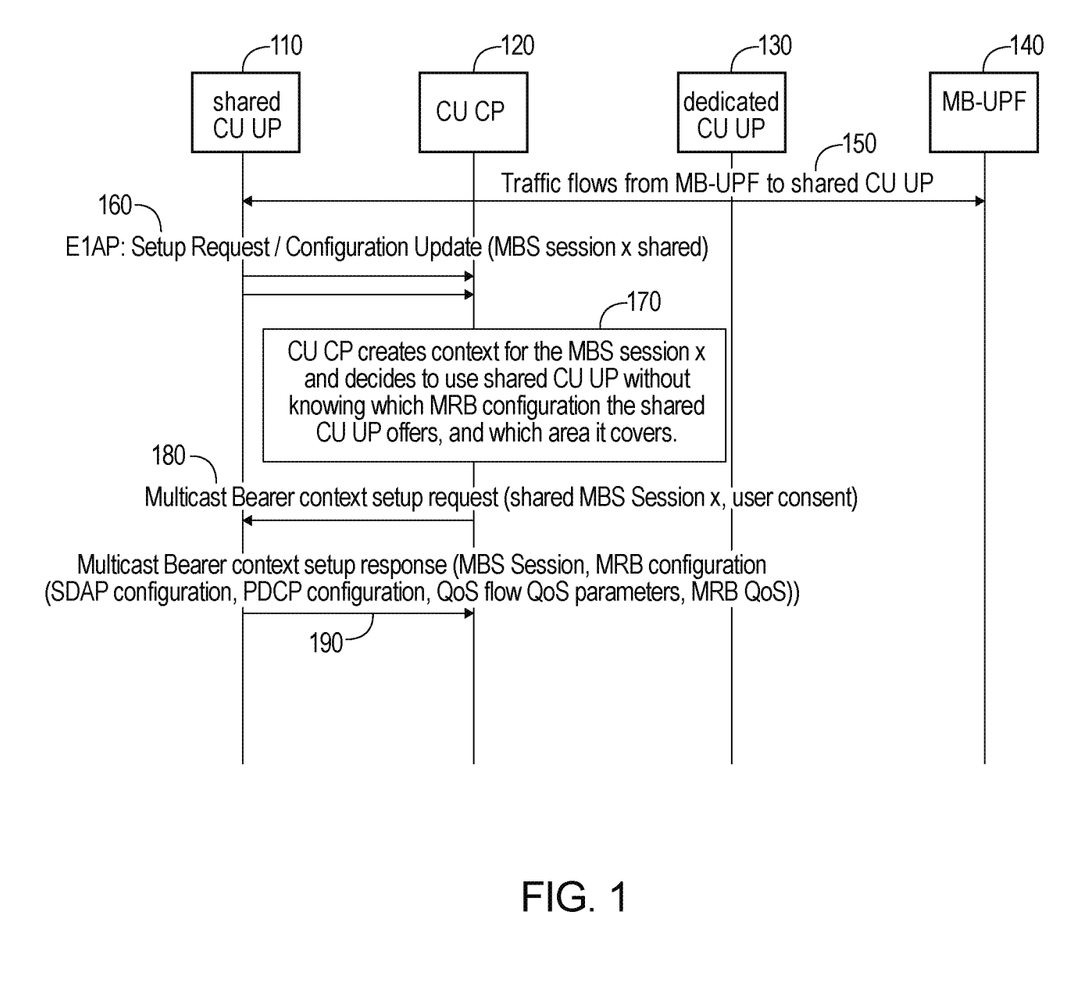
FIG. 1 illustrates a shared central unit user plane in a system.

FIG. 1 illustrates a shared central unit user plane in a system as currently disclosed. As shown in FIG. 1, a system can include a shared CU UP 110, a CU CP 120, a dedicated CU UP 130, and a multicast-broadcast user plane function (MB-UPF) 140. At 150, there can be traffic flows from the MB-UPF 140 to the shared CU UP 110.

At 160, using E1 application protocol (E1AP) there can be setup request and configuration update that a given MBS session is shared from the shared CU UP 110 to the CU CP 120. At 170, the CU CP 120 can create a context for the given MBS session and can decide to use shared CU UP 110 without knowing what MBS configuration the shared CU UP 110 offers, and which area the shared CU UP 110 covers. Thus, at 180, the CU CP 120 can send a multicast bearer context setup request, with user consent, for the given shared MBS session. The shared CU UP 110 can respond with a multicast bearer context setup response, which may identify the given MBS session and multicast radio bearer (MRB) configuration. The MRB configuration can include service data adaptation protocol (SDAP) configuration, PDCP configuration, QoS flow QoS parameters, mapping between QoS flows and MRB, and MRB QoS configuration.

In the approach of FIG. 1, the subsequent CU CPs, such as CU CP 120, may request service from the shared CU UP 110 with a consent without knowing the exact radio configuration and area that the shared CU UP 110 offers.

Figure 2:
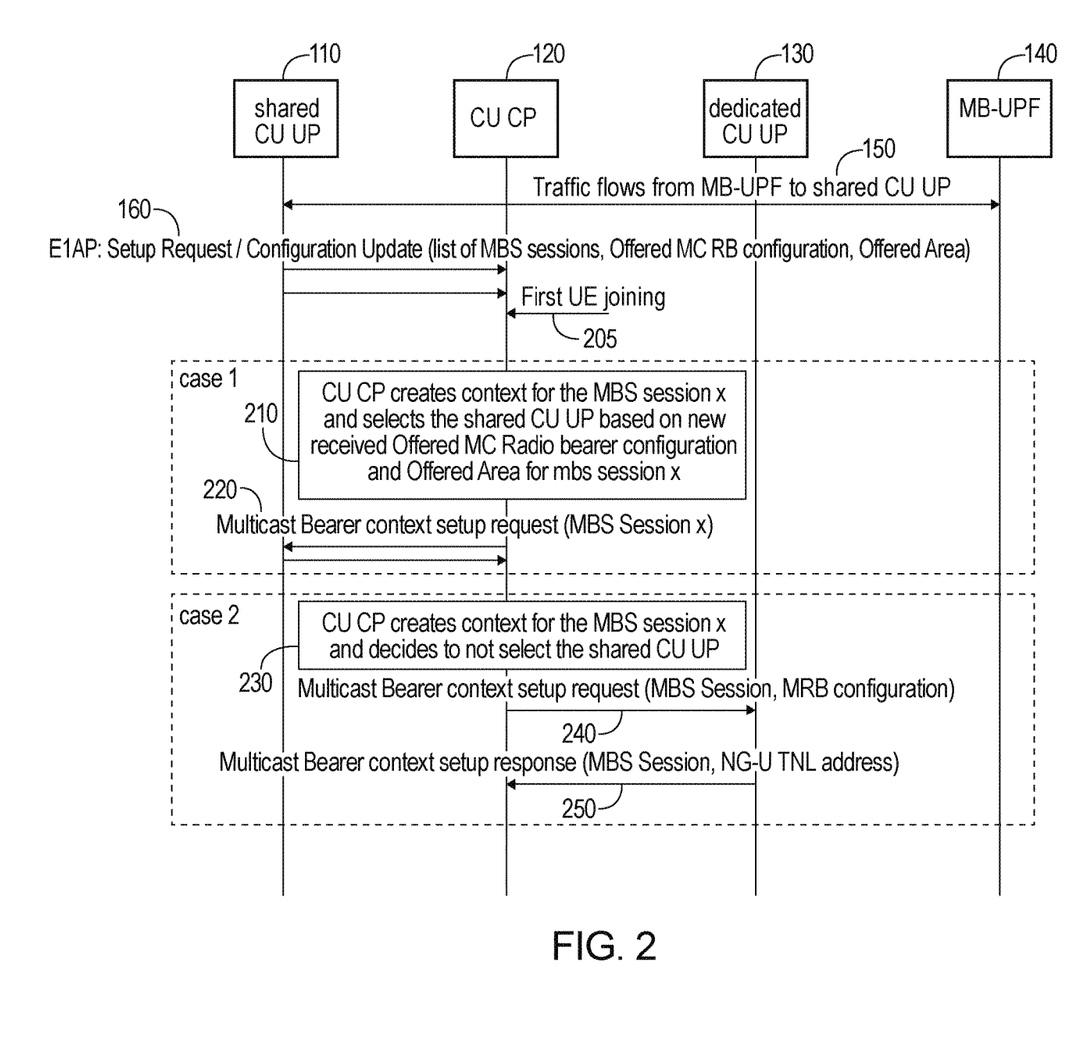
FIG. 2 illustrates a signal flow diagram of a method according to certain embodiments.

FIG. 2 illustrates a signal flow diagram of a method according to certain embodiments. In the approach illustrated in FIG. 2, the offered radio configuration and the offered area can be provided in an E1 setup/configuration update. At E1 setup or E1 configuration update, which may be two different E1AP messages, the CU UP can indicate to CU CPs for each MBS session for which the CU UP offers the sharing the following new information: an offered multicast radio bearer configuration information element (IE) currently in use which the CU UP offers in terms of at least one of SDAP configuration, PDCP configuration, MBS QoS flow parameters, MBS QoS flow to MRB mapping, MRB QoS, or any combination thereof; and the offered MBS service area IE, which is an area over which the CU UP can serve as shared CU UP for the MBS session or a list of offered MBS service areas each associated to an area session ID for location dependent service. The offered MBS service area IE can be a list of tracking area identities (TAIs) and cells.

When requesting the service from a CU UP, the CU CP can select the appropriate shared CU UP based on the offered multicast radio bearer configuration IE and the one or more offered MBS service area IE. If the CU CP has not received any MBS session information and corresponding multicast (MC) radio bearer (RB) configuration offered from the CU UP and or corresponding broadcast (BC) RB configuration offered from the CU UP (case of a broadcast service), the CU CP can select the shared CU UP or dedicated CU UP for requesting multicast bearer context setup based on the received offered area.

As shown in FIG. 2, at 150 there can be traffic flows between the MB-UPF 140 and the shared CU UP 110. At 160, the shared CU UP 110 can indicate to CU CPs, such as CU CP 120, in E1 setup request/E1 configuration update messages that the shared CU UP 110 offers sharing for a list of MBS sessions. The shared CU UP 110 can include the area for which the sharing by shared CU UP 110 applies, such as a list of TAIs and/or list of cells. If the shared CU UP 110 is serving one or more MBS sessions, shared CU UP 110 can include, for each MBS session, the offered multicast/broadcast radio bearer configuration, such as MRB SDAP configuration, MRB PDCP configuration, QoS flows to MRB mapping configuration, QoS flow parameters, MRB QoS, or any combination thereof. At 205, a first UE may join an MBS session at the CU CP 120.

At 210, in what is identified for convenience only and not by way of preference or priority as case 1, whenever CU CP 120 decides to create a CU UP context, for example to reserve the CU UP resources, for a given MBS session, which was part of the list of MBS sessions shared by shared CU UP at 160, the CU CP 120 can determine to use the shared CU UP 110 in comparison to a dedicated CU UP 130, or potentially another shared CU UP (not shown), due to the information received at 160 which may satisfy the CU CP 120. At 220, therefore, the CU CP 120 can set up the multicast bearer with shared CU UP 110 for the given MBS session using a multicast bearer context setup request.

At 230, in what is identified for convenience only and not by way of preference or priority as case 2, whenever a CU CP 120 decides to create a CU UP context (i.e. reserve the CU UP resources) for a given MBS session, which was part of the list of MBS sessions shared by shared CU UP 110 at 160, the CU CP 120 can determine to use a dedicated CU UP 130 (or potentially another shared CU UP, not shown) in comparison to the shared CU UP 110 due to the information received at 160, which may not satisfy the CU CP 120. Thus, at 240, the CU CP 120 may send a multicast bearer context setup request identifying an MBS session and an MRB configuration. At 250, the dedicated CU UP 130 may provide a multicast bearer context setup response, identifying the MBS session and next generation user plane interface (NG-U) tunneling (TNL) address.

In both cases, if the CU CP 120 has not received any MBS session information and corresponding MC or BC RB configuration offered from the shared CU UP 110, the CU CP 120 can select the shared CU UP 110 or instead dedicated CU UP 130 or instead another shared CU UP for requesting multicast bearer context setup based on the received offered area.

Figure 3:
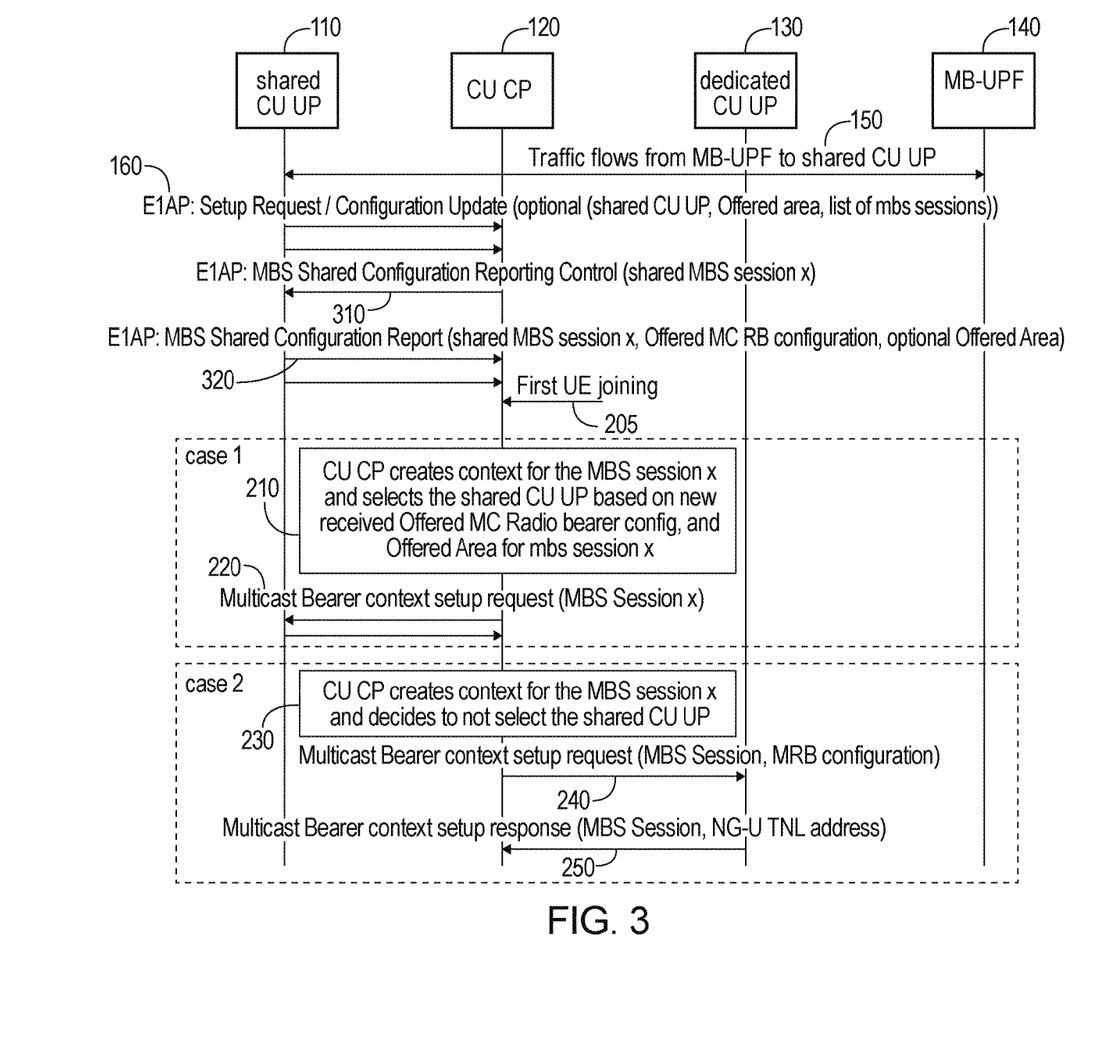
FIG. 3 illustrates a signal flow diagram of a method according to certain embodiments.

FIG. 3 illustrates a signal flow diagram of a method according to certain embodiments. In the approach illustrated in FIG. 3, the offered radio configuration can be provided in an MBS shared configuration report and an offered area can be provide in an E1 setup/configuration update or an MBS shared configuration report.

Instead of the shared CU UP 110 reporting the offered multicast radio bearer configuration IE and every update to all CU CPs, the CU UP 110 can instead only report the offered multicast radio bearer configuration IE to those CU CPs that have requested to receive such updates for some particular MBS sessions. At 205, a first UE may join the CU CP 210 after traffic flows between the MB-UPF and the CU UP 110, as in FIG. 2. Moreover, there may be, at 160, an E1AP setup request/configuration update. This message may optionally include an indication of a shared CU UP, one or more offered areas, and list of MBS sessions.

In the approach of FIG. 3, different from the approach of FIG. 2, there may be, at 310, an E1AP MBS shared configuration reporting control message, which may include an indication of a given shared MBS session. There may also be, at 320, an E1AP MBS shared configuration report, which may indicate the given shared MBS session, an offered MC or BC RB configuration, and optionally an offered area). The remainder of FIG. 3 may resemble the approach of FIG. 2 in that case 1 and case 2 may correspond to the same procedures already discussed above. Procedure 320 shows one or more E1AP MBS shared configuration report messages: the first one may correspond to an immediate response to the MBS shared configuration reporting control message and the subsequent ones to any update of the MBS RB configuration done in the shared CU UP.

Thus, in the approach of FIG. 3 there may be two MBS-specific E1AP messages: an MBS shared configuration reporting control, which may indicate a specific shared MBS session; and an MBS shared configuration report, which may indicate a specific shared MBS session and an offered multicast radio bearer configuration IE.

For the one or more offered MBS service area IE(s) there can be two options, as shown in FIG. 3. In one option the offered MBS service area IE can be received in E1 setup request/configuration update. In another option, the offered MBS service area IE can be added to the MBS shared configuration report message together with the offered multicast radio bearer configuration IE. For example, the MBS shared configuration report can include an identification of a specific shared MBS session, an offered multicast radio bearer configuration IE, and an offered MBS service area IE.

The shared CU UP 110 can send the MBS shared configuration report message at 320 as an immediate reply when receiving a MBS shared configuration reporting control message at 310 from CU CP 120. The shared CU UP 110 can also subsequently send the message every time there is an update of the MC radio configuration and/or the offered area, if the offered area is included.

When requesting the service from a CU UP, the CU CP 120 can select the appropriate shared CU UP, such as shared CU UP 110, based on the offered multicast radio bearer configuration IE and/or the one or more offered MBS service area IE(s).

If the CU CP has not received any MBS session information and corresponding MC (or BC) RB configuration offered from a CU UP, the CU CP can select the shared CU UP 110 or dedicated CU UP 130 or another shared CU UP for requesting multicast bearer context setup based on a received offered area.

In this embodiment, at 160, the shared CU UP 110 can indicate to CU CPs, such as CU CP 120, in E1 setup request/E1 Configuration update messages that shared CU UP 110 offers sharing for a list of MBS sessions. These sessions may be uniquely identified by a corresponding identifier. The shared CU UP 110 may include an optional information element that indicates one or more offered area(s) for which the sharing applies, which each may be expressed as a list of TAIs, a list of cells, list of next generation Node B distributed unit identities, or any combination thereof. The service area could change. For example, new cells could be added to the area, but at a given point of time there may be one service area that the CU UP signals to the CU CP(s). Moreover, the areas of shared CU UPs may overlap with one another. In certain embodiments, the service area may be defined on a per MBS session basis.

At 310, whenever CU CP 120 is interested to use or potentially use the shared CU UP 110 for at least one of the MBS sessions indicated at 160, for example a specific MBS session, CU CP 120 may send an E1AP MBS shared configuration reporting control message to request to receive the offered multicast/broadcast radio configuration for the given MBS session, and optionally also requesting the offered area served by the shared CU UP, if not already provided at 160, and also to be informed of any subsequent updates of these values. At 320, the shared CU UP 110 can reply with an E1AP MBS shared configuration report indicating, for the given MBS session, the offered multicast/broadcast radio bearer configuration (for example, MRB SDAP configuration, MRB PDCP configuration, QoS flows to MRB mapping configuration, QoS flow Qos parameters, MRB QoS, or any combination thereof) and optionally the one or more offered areas if not already provided at 160. At 320, the shared CU UP 110 can also subsequently inform the CU CP 120 of any update of these values by sending a subsequent E1AP MBS shared configuration report message with the new values (not explicitly shown in FIG. 3).

At 210, whenever CU CP 120 decides to create a CU UP context, for example to reserve the CU UP resources, for a given MBS session that was part of the list of MBS sessions shared by shared CU UP 110, the CU CP 120 can determine to use the shared CU UP 110 in comparison to a dedicated CU UP 130 (or potentially another shared CU UP not shown in FIG. 3) due to the information received from the shared CU UP 110, which satisfies the CU CP 120. At 220, the multicast bearer context can be set up with a multicast bearer context setup request for a given MBS session and a corresponding response.

At 230, whenever CU CP 120 decides to create a CU UP context, for example to reserve the CU UP resources) for an MBS session x (which was part of the list of MBS sessions shared by shared CU UP in step 1) the CU CP 120 can determine instead to use a dedicated CU UP 130 (or potentially another shared CU UP not shown) in comparison to the shared CU UP 110 due to the information received from the shared CU UP 110, which does not satisfy the CU CP 120 in this example. At 240, the multicast bearer context can be set up with a multicast bearer context setup request for a given MBS session, followed by a corresponding response 250.

As to case 1 or case 2, the CU CP 120 may receive only the one or more offered areas prior to making a decision to use shared CU UP 110 or dedicated CU UP 130, for example if shared CU UP 110 is not serving an MBS Session yet. The CU CP 120 can then use the one or more offered areas for selection of the shared CU UP or dedicated CU UP, if the session being set up is the first CU CP serving an MBS session.

Figure 4:
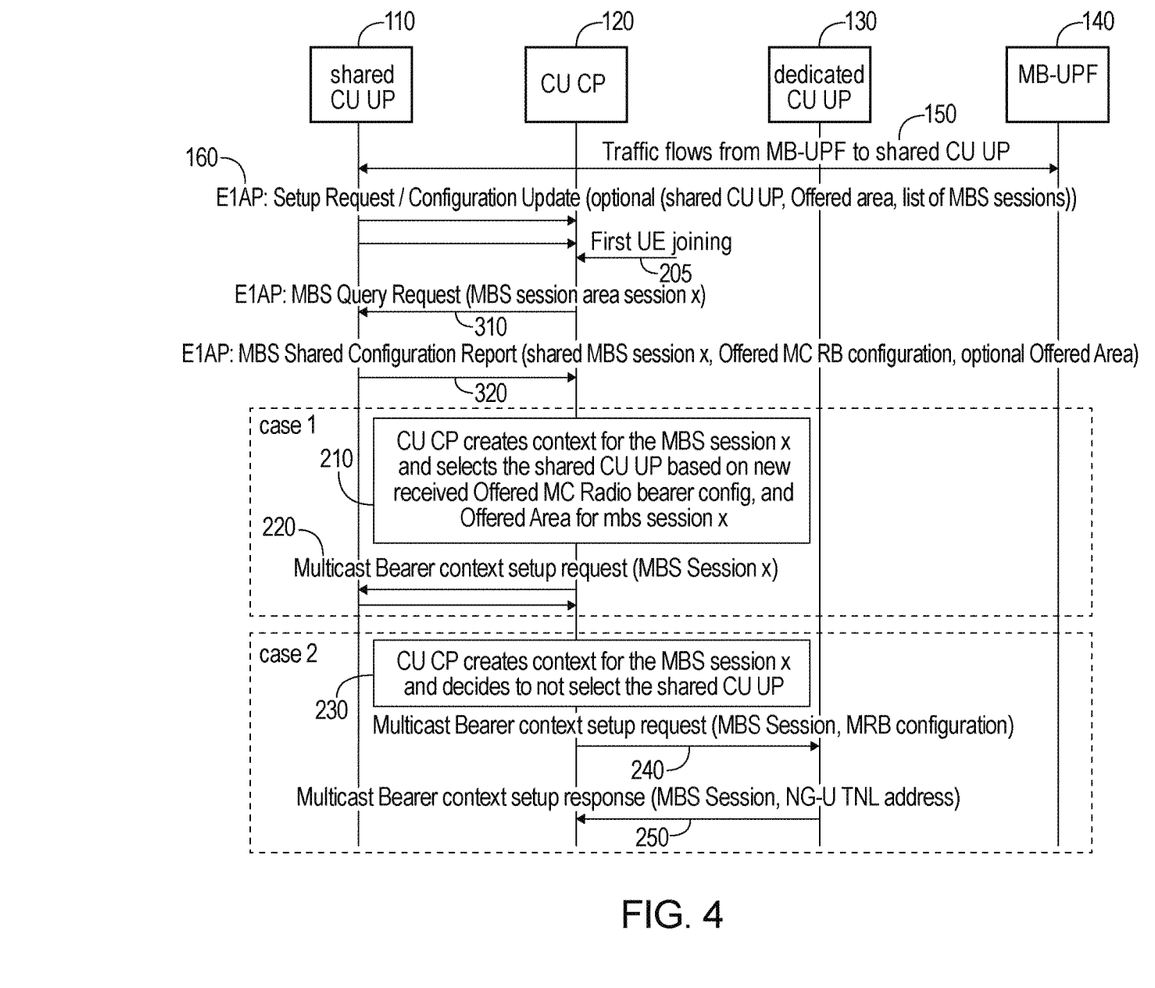
FIG. 4 illustrates a signal flow diagram of a method according to certain embodiments.

FIG. 4 illustrates a signal flow diagram of a method according to certain embodiments. In the approach illustrated in FIG. 4, an offered radio configuration can be provided in an MBS query response and one or more offered areas can be identified in an E1 setup/configuration update and/or MBS query response. One difference between the approach of FIG. 3 and the approach of FIG. 4 may be the timing of the first UE joining at 204 relative to the E1AP request at 310 and E1AP response at 320.

In the approach of FIG. 4, the CU CP 120 can, at 310, query the shared CU UP 110 about the offered multicast radio bearer configuration IE of the shared CU UP 110 just before reserving the resources, triggered by the first UE joining at 205, and can, at 320, receive an immediate one time reply from the shared CU UP. In this approach there may be no need for an update, as the CU CP can decide reserving or not the resources immediately after the reply.

Certain embodiments may rely on an MBS-specific E1AP class 1 procedure involving, at 310, an MBS query request, with an identification of a specific shared MBS session and, at 320, an MBS query response, with an identification of the specific shared MBS session and offered multicast radio bearer configuration IE. other embodiments may rely on sending an MBS-E1AP Bearer context setup/modify request involving, at 310, an MBS query request information element, with an identification of a specific shared MBS session and, at 320, an E1AP Bearer context setup/modify response, with an identification of the specific shared MBS session and offered multicast radio bearer configuration IE.

For the offered one or more MBS service area IE(s), there are at least two options as shown in FIG. 4. In one option, the one or more offered MBS service area IEs can be received in E1 setup request/configuration update at 160. In another option, the one or more offered MBS service area IEs may be added to the MBS query response at 320 (or E1AP Bearer context setup/modify response in other embodiments) together with the offered multicast radio bearer configuration IE. For example, the MBS query response (or E1AP Bearer context setup/modify response in other embodiments) can include the identification of the shared MBS session, a multicast radio bearer configuration IE, and one or more offered MBS service area IEs.

When requesting the service from shared CU UP 110, the CU CP 120 can select the appropriate shared CU UP based on the offered multicast radio bearer configuration IE and/or the one or more offered MBS service area IEs.

If the CU CP 120 has not received any MBS session information and corresponding MC (or BC) RB configuration offered from the shared CU UP 110, the CU CP 120 can select the shared CU UP 110 or dedicated CU UP 130 for requesting multicast bearer context setup based on the received one or more offered areas.

Thus, as shown in FIG. 4, at 160, the shared CU UP 110 can indicate to CU CPs, such as CU CP 120, in E1 setup request/E1 configuration update messages that shared CU UP 110 offers sharing for a list of MBS sessions. Shared CU UP 110 may optionally include the one or more offered areas for which sharing of shared CU UP 110 applies, expressed as, for example, each offered area comprising a list of TAIs and/or a list of cells.

At 310, whenever a CU CP is interested to use the shared CU UP 110 for at least one of the MBS sessions indicated at 160, for example a specific given MBS session, because for example a first UE just joined the given MBS session at 205 in this CU CP 120, the CU CP 120 can send an E1AP MBS query request message to request to receive the offered multicast/broadcast radio configuration for the given MBS session, and optionally to request the one or more offered areas for the given MBS session, if not known or received at 160. The shared CU UP 110 can reply at 320 with an E1AP MBS query response message (or E1AP Bearer context setup/modify response with new information elements in other embodiments) indicating for the given MBS session the offered multicast/broadcast radio bearer configuration, which can include, for example, MRB SDAP configuration, MRB PDCP configuration, QoS flows to MRB mapping configuration, QoS flow parameters, and/or MRB QoS. The reply at 320 can optionally include the one or more offered area, for example if not reported at 160.

In case 1, at 210, when the CU CP 120 decides to create the CU UP context, for example to reserve the resources in a CU UP, for the given MBS session that was part of the list of MBS sessions shared by shared CU UP 110 at 160, the CU CP 120 can determine to use the shared CU UP 110 in comparison to a dedicated CU UP 130 (or potentially another shared CU UP not shown in FIG. 4) due to the information received at 320 and optionally at 160, which may satisfy the CU CP 120.

In case 2, when the CU CP 120 decides to create the CU UP context, for example to reserve the resources in a CU UP, for a given MBS session that was part of the list of MBS sessions shared by shared CU UP 110 at 160, the CU CP 120 can determine to use a dedicated CU UP 130 (or potentially another shared CU UP not shown in FIG. 4) in comparison to the shared CU UP 110 due to the information received at 320 and optionally at 160, which may not satisfy the CU CP 120.

In both cases, the CU CP 120 may receive only the one or more offered areas at 160 or 320, if the shared CU UP 110 is not serving an MBS session yet. The CU CP may then use the one or more offered areas for selection of the shared CU UP 110 or dedicated CU UP 130, if the CU CP 120 is the first CU CP serving an MBS session.

Figure 5A:
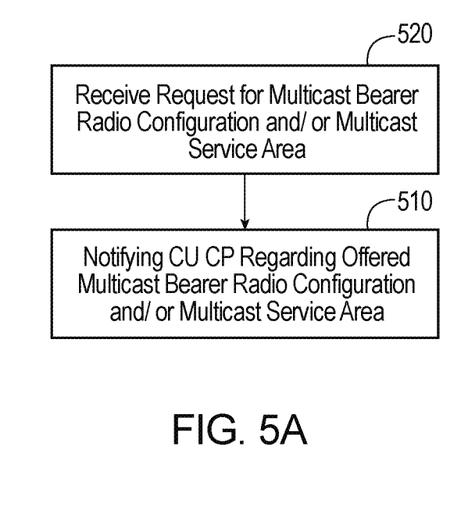
FIG. 5A illustrates an example flow diagram of a method, according to an embodiment.

FIG. 5A illustrates an example flow diagram of a method for providing informing a central unit control plane regarding the capabilities and/or service area of a central unit user plane, according to certain embodiments.

The method can include, at 510, notifying, by a central unit user plane to a central unit control plane using a message, at least one of an offered multicast radio bearer configuration and one or more offered service areas corresponding to the shared CU UP. The message may include an offered multicast radio bearer configuration to be shared in relation with a multicast/broadcast session served by the central unit user plane. Thus, the notifying can correspond to procedures 160 and/or 320 in FIGS. 2, 3, and 4.

Each offered service area can be expressed as a list of tracking area identities, cells, distributed unit identities, or any combination thereof. For example, the distributed unit identities may be identities of gNB-DUs. Other ways of identifying the offered service area are also permitted. Each offered service area can correspond to an area session identifier of a multicast/broadcast session operating with location dependent content.

The notifying the multicast radio bearer configuration can be performed in a separate message from the notifying the one or more offered service areas. For example, the notifying the multicast radio bearer configuration can be performed in a separate message from the notifying of the at least one offered service area(s). Thus, the notifying can involve one or more messages. In certain embodiments, the notifying the multicast radio bearer configuration can be performed multiple times, for example as the multicast radio bearer configuration may be updated.

The multicast radio bearer configuration can include at least one of the following: a service data adaptation protocol configuration, a packet data convergence protocol configuration, multicast and broadcast session quality of service flow parameters, mapping of multicast and broadcast session quality of service flows to multicast radio bearer, or multicast radio bearer quality of service configuration. Any combination of such configuration or any similar configuration information may also be provided.

The method may also include, at 520, receiving a request from the central unit control plane for additional or updated information regarding a specified multicast/broadcast session. The notifying can be based on the request and the offered multicast radio bearer configuration corresponds to the specified multicast/broadcast session. For example, procedures 310 and 320 in FIGS. 3 and 4 illustrate a request and response format that can be used.

The notifying can include sending an identification of the specified multicast/broadcast session. For example, in FIGS. 2, 3, and 4, the identification used is "MBS session x" or the like. In practice, other forms of identification may be used.

The notifying can be triggered by the request or by an update that occurs after the request is received. The request itself can be triggered by various occasions, such the first joining of a UE to the CU CP.

The message can be at least one of an E1 setup request, an E1 configuration update, a multicast/broadcast service shared configuration report. Other messages can also be used or information elements in an E1 context setup/modification response messages.

The message can be sent during an E1 setup or configuration update or in response to a query from the central unit control plane.

It is noted that FIG. 5A is provided as one example embodiment of a method or process. However, certain embodiments are not limited to this example, and further examples are possible as discussed elsewhere herein.

Figure 5B:
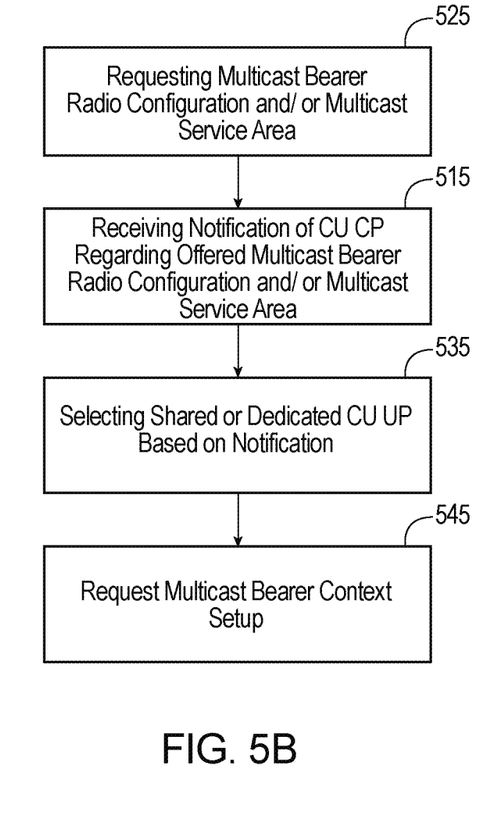
FIG. 5B illustrates an example flow diagram of a method, according to an embodiment.

FIG. 5B illustrates an example flow diagram of a method for providing informing a central unit control plane regarding the capabilities and/or service area(s) of a central unit user plane, according to certain embodiments. The method of FIG. 5B can be used alone or in combination with the method of FIG. 5A.

The method can include, at 515, receiving, from a central unit user plane at a central unit control plane in a message, notification of an offered multicast radio bearer configuration. As mentioned above, this message may include an offered multicast radio bearer configuration to be shared in relation with a multicast/broadcast session served by the central unit user plane.

The method can also include, at 535, determining whether to select and, when appropriate, selecting the central unit user plane based on the offered multicast radio bearer configuration and/or one or more offered service areas.

The receiving can further include receiving one or more offered service areas corresponding to the shared CU UP. The selecting can further be based on the one or more offered service areas. In case there is not yet an offered multicast radio bearer configuration, the selecting can be based on the one or more offered service areas alone.

Each offered service area can be expressed as a list of tracking area identities, cells, distributed unit identities, or any combination thereof, as mentioned above. As mentioned above, each offered service area corresponds to an area session identifier of a multicast/broadcast session operating with location dependent content.

The notifying the multicast radio bearer configuration can be performed in a separate message from the notifying the one or more offered service area. As mentioned above, wherein the notifying the multicast radio bearer configuration can be performed in a separate message from the notifying of the at least one offered service area(s). As another option, the service areas and configuration can be notified in the same message.

The multicast radio bearer configuration may include, for example, such configuration information as a service data adaptation protocol configuration, a packet data convergence protocol configuration, multicast and broadcast session quality of service flow parameters, mapping of multicast and broadcast session quality of service flows to multicast or radio bearer, or multicast radio bearer quality of service configuration.

The central unit user plane can be a shared central unit user plane and the selecting can involve selecting between the shared central unit user plane and a dedicated central unit user plane or another shared central unit user plane.

The method can also include, at 545, requesting multicast bearer context setup based on the selection. For example, the request for multicast bearer context setup can be made to the shared or dedicated CU UP according to the selection made.

The message can be at least one of an E1 setup request, an E1 configuration update, a multicast/broadcast service shared configuration report or E1AP Bearer context setup/modify response with new information elements in other embodiments.

The message can be sent during an E1 setup or configuration update or in response to a query from the central unit control plane, such as the request at 525.

Thus, at 525, the method may include querying the central unit user plane regarding the offered multicast radio bearer configuration. The message received at 515 can be received in response to the querying at 525.

It is noted that FIG. 5B is provided as one example embodiment of a method or process. However, certain embodiments are not limited to this example, and further examples are possible as discussed elsewhere herein.

Figure 6:
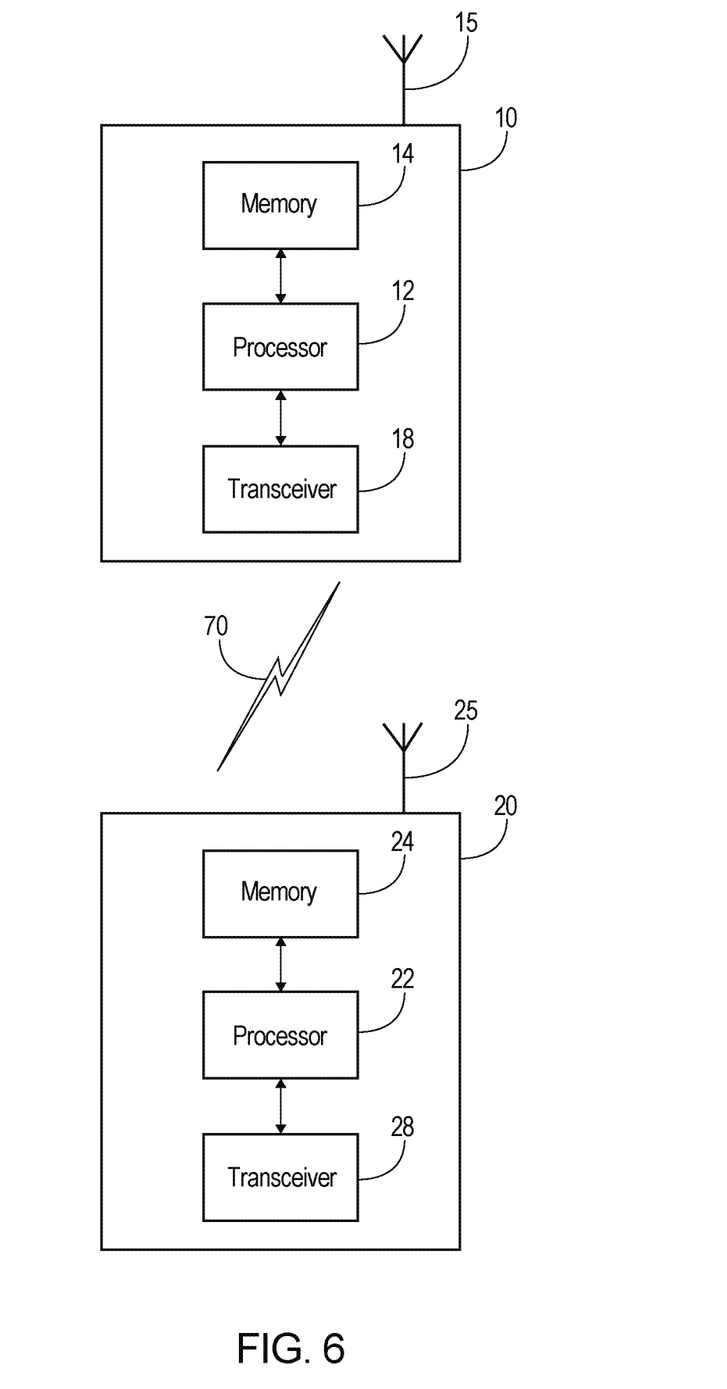
FIG. 6 illustrates an example block diagram of a system, according to an embodiment.

FIG. 6 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 6.

As illustrated in the example of FIG. 6, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 3-6, or any other method described herein. In some embodiments, as discussed herein, apparatus 10 may be configured to perform a procedure relating to providing informing a central unit control plane regarding the capabilities and/or service area of a central unit user plane, for example.

FIG. 6 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6.

As illustrated in the example of FIG. 6, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 3-6, or any other method described herein. For example, in an embodiment, apparatus 20 may be controlled to perform a process relating to providing informing a central unit control plane regarding the capabilities and/or service area of a central unit user plane, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may permit a CU CP to be well aware of the area and multicast/broadcast radio configuration offered by a shared CU UP before requesting the CU CP to reserve resources for an MBS session. This awareness may allow the CU CP to make an educated selection of the appropriate shared CU UP, if multiple are available, or to select instead a dedicated CU CP if no shared CU UP is satisfactory. This educated selection of the services of a shared CU UP may prevent a CU CP from requesting resources of a shared CU UP and then needing to cancel/release those resources immediately afterwards because these resources are unsatisfactory, in terms of offered multicast/broadcast radio configuration and/or area. Such a trial and error process could be very inefficient, particularly if repeated.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

CU CP Central Unit Control Plane
CU UP Central Unit User Plane
CN Core Network
MBS Multicast/Broadcast Services
NAS Non-Access Stratum
QoS Quality of Service
UE User Equipment

We claim:

1. An apparatus, comprising:
   at least one processor; and
   at least one memory including computer program code,
   wherein the at least one memory and the computer program code are configured to, with the at least one processor, cause the apparatus at least to:
   notify, by a central unit user plane of the apparatus to a central unit control plane using a message indicating at least one of an offered multicast radio bearer configuration to be shared in relation with a multicast session served by the central unit user plane, an offered broadcast radio bearer configuration to be shared in relation with a broadcast session served by the central unit user plane, or at least one offered service area corresponding to the central unit user plane.

2. The apparatus of claim 1, wherein the at least one offered service area is expressed as a list of tracking area identities, cells, distributed unit identities, or any combination thereof.

3. The apparatus of claim 1, wherein each offered service area corresponds to an area session identifier of a multicast and/or broadcast session operating with location dependent content.

4. The apparatus of claim 1, wherein the at least one offered service area is on a per multicast and/or broadcast service session basis.

5. The apparatus of claim 1, wherein the notifying the multicast or broadcast radio bearer configuration is performed in a separate message from the notifying of the at least one offered service area.

6. The apparatus of claim 1, wherein the offered multicast or broadcast radio bearer configuration comprises at least one of a service data adaptation protocol configuration, a packet data convergence protocol configuration, multicast or broadcast session quality of service flow parameters, multicast or broadcast session quality of service flow(s) to multicast or broadcast radio bearer mapping, or multicast or broadcast radio bearer quality of service configuration.

7. The apparatus of claim 1, wherein the at least one memory and the computer program code are further configured to, with the at least one processor, cause the apparatus at least to:
   receive a request from the central unit control plane for additional or updated information regarding a specified multicast or broadcast session, wherein the notifying is in response to the request and the offered multicast or broadcast radio bearer configuration corresponds to the specified multicast or broadcast session.

8. The apparatus of claim 7, wherein the notifying comprises sending an identification of the specified multicast or broadcast session.

9. The apparatus of claim 7, wherein the notifying is triggered by the request or by an update that occurs after the request is received.

10. The apparatus of claim 1, wherein the message comprises at least one of a setup request/response, a configuration update, a multicast/broadcast service shared configuration report, a query response, an information element of a bearer context setup response or of a bearer context modification response.

11. An apparatus, comprising:
    at least one processor; and
    at least one memory including computer program code,
    wherein the at least one memory and the computer program code are configured to, with the at least one processor, cause the apparatus at least to:
    receive, at a central unit control plane of the apparatus and from a central unit user plane a message, notification of at least one of an offered multicast radio bearer configuration to be shared in relation with a multicast session served by the central unit user plane, an offered broadcast radio bearer configuration to be shared in relation with a broadcast session served by the central unit user plane, or at least one offered service area corresponding to the central unit user plane; and
    determine whether to select the central unit user plane based on the received notification.

12. The apparatus of claim 11, wherein the at least one offered service area is expressed as a list of tracking area identities, cells, distributed unit identities, or any combination thereof.

13. The apparatus of claim 11, wherein each offered service area corresponds to an area session identifier of a multicast or broadcast session operating with location dependent content.

14. The apparatus of claim 11, wherein the multicast or broadcast radio bearer configuration comprises at least one of a service data adaptation protocol configuration, a packet data convergence protocol configuration, multicast or broadcast session quality of service flow parameters, mapping of one or more multicast or broadcast session quality of service flow(s) to multicast or broadcast radio bearer, or multicast or broadcast radio bearer quality of service configuration.

15. The apparatus of claim 11, wherein the central unit user plane comprises a shared central unit user plane and wherein the selecting comprises selecting between the shared central unit user plane and a dedicated central unit user plane or another shared central unit user plane.

16. The apparatus of claim 15, wherein the at least one memory and the computer program code are further configured to, with the at least one processor, cause the apparatus at least to:
request multicast bearer context setup based on the selection.

17. The apparatus of claim 11, wherein the at least one memory and the computer program code are further configured to, with the at least one processor, cause the apparatus at least to:
send a request from the central unit control plane for additional or updated information regarding a specified multicast or broadcast session, wherein the notification is received in response to the request and the offered multicast or broadcast radio bearer configuration corresponds to the specified multicast or broadcast session.

18. The apparatus of claim 17, wherein the notification comprises an identification of the specified multicast or broadcast session.

19. The apparatus of claim 11, wherein the message comprises at least one of a setup request, a configuration update, a multicast/broadcast service shared configuration report, a multicast/broadcast service query response, a bearer context setup response, a bearer context modification response.

20. A method, comprising:
notifying, by a central unit user plane to a central unit control plane using a message indicating at least one of an offered multicast radio bearer configuration to be shared in relation with a multicast session served by the central unit user plane, an offered broadcast radio bearer configuration to be shared in relation with a broadcast session served by the central unit user plane, or at least one offered service area corresponding to the central unit user plane.

* * * * *